UNITED STATES PATENT OFFICE.

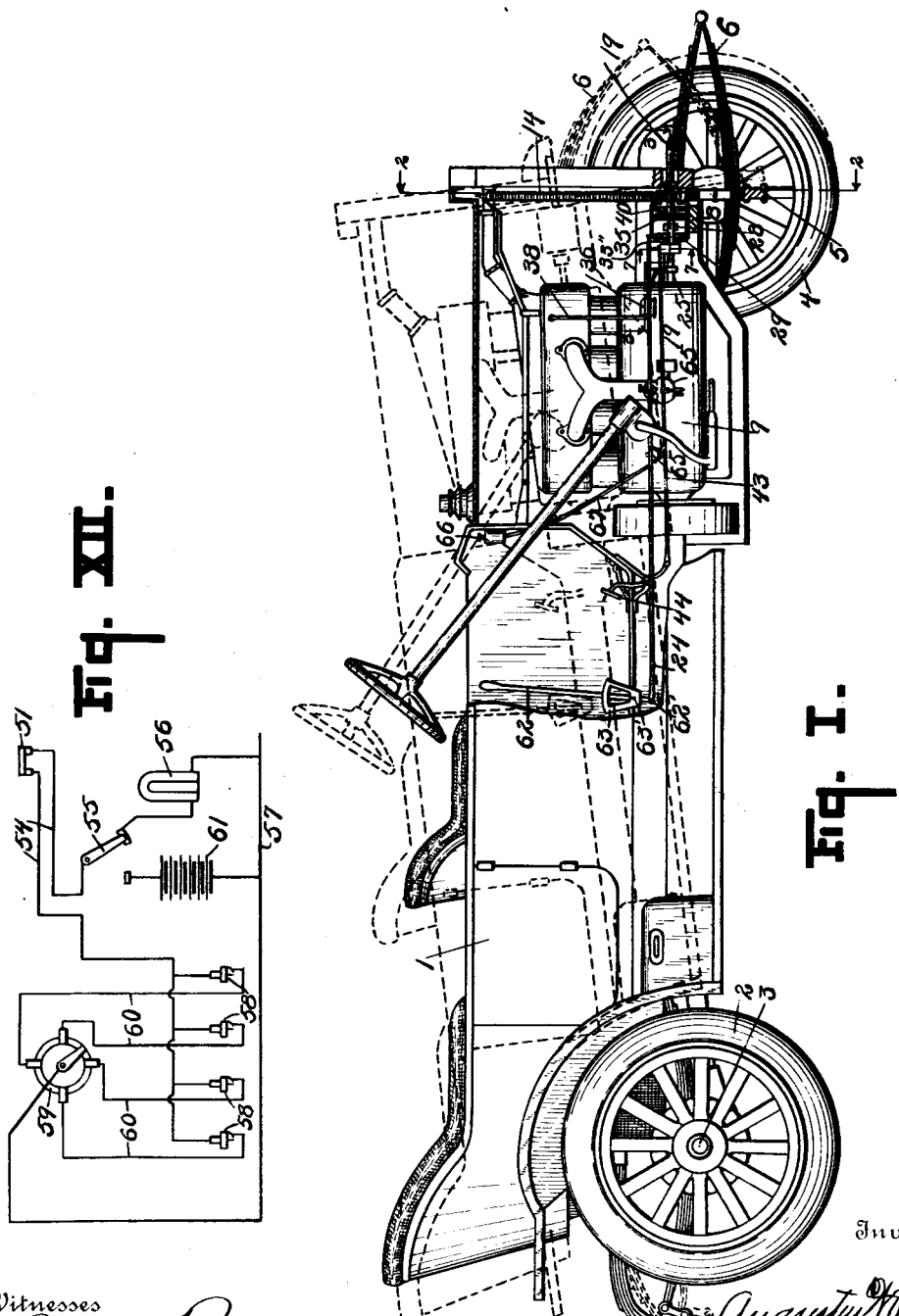

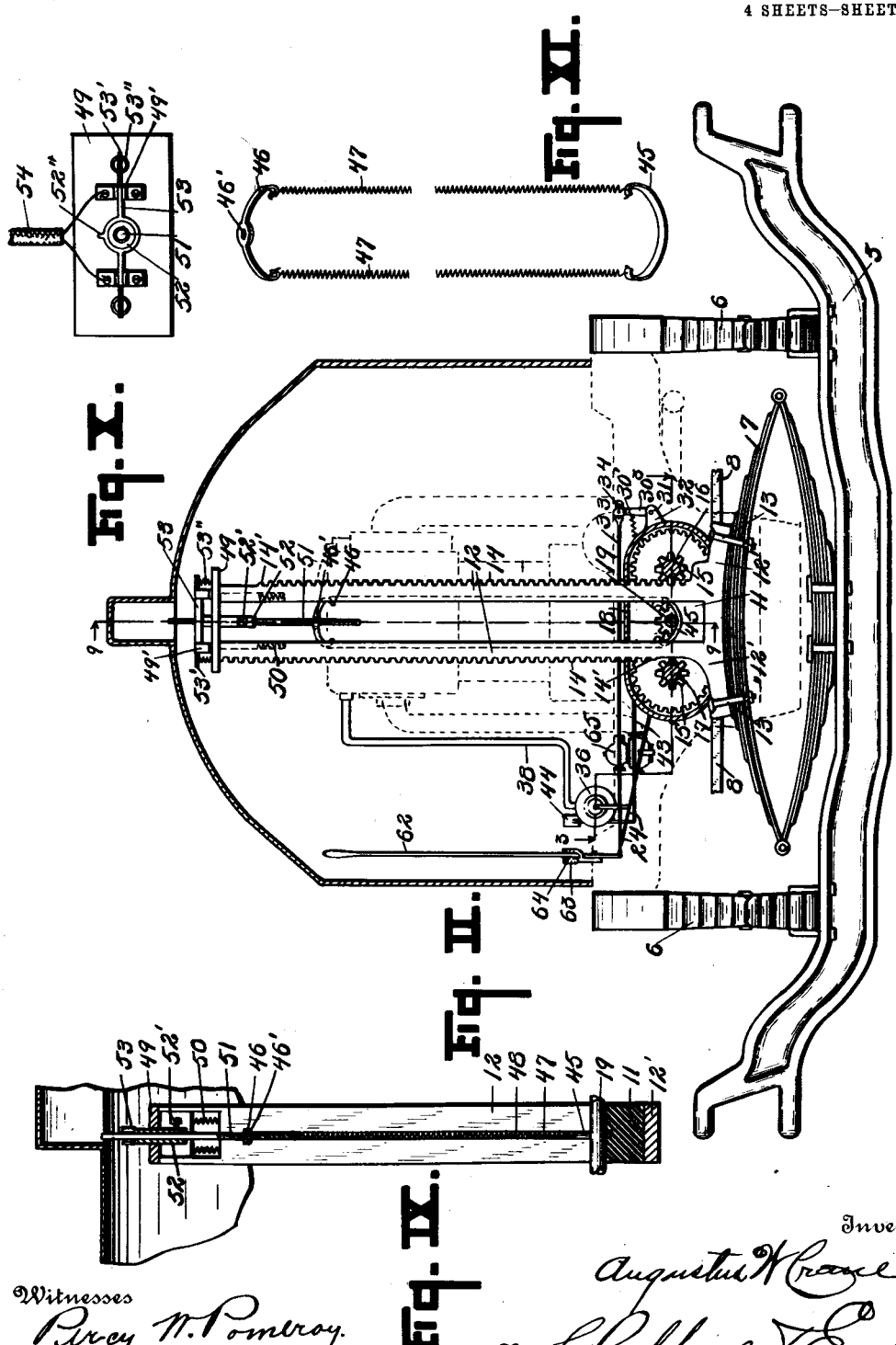

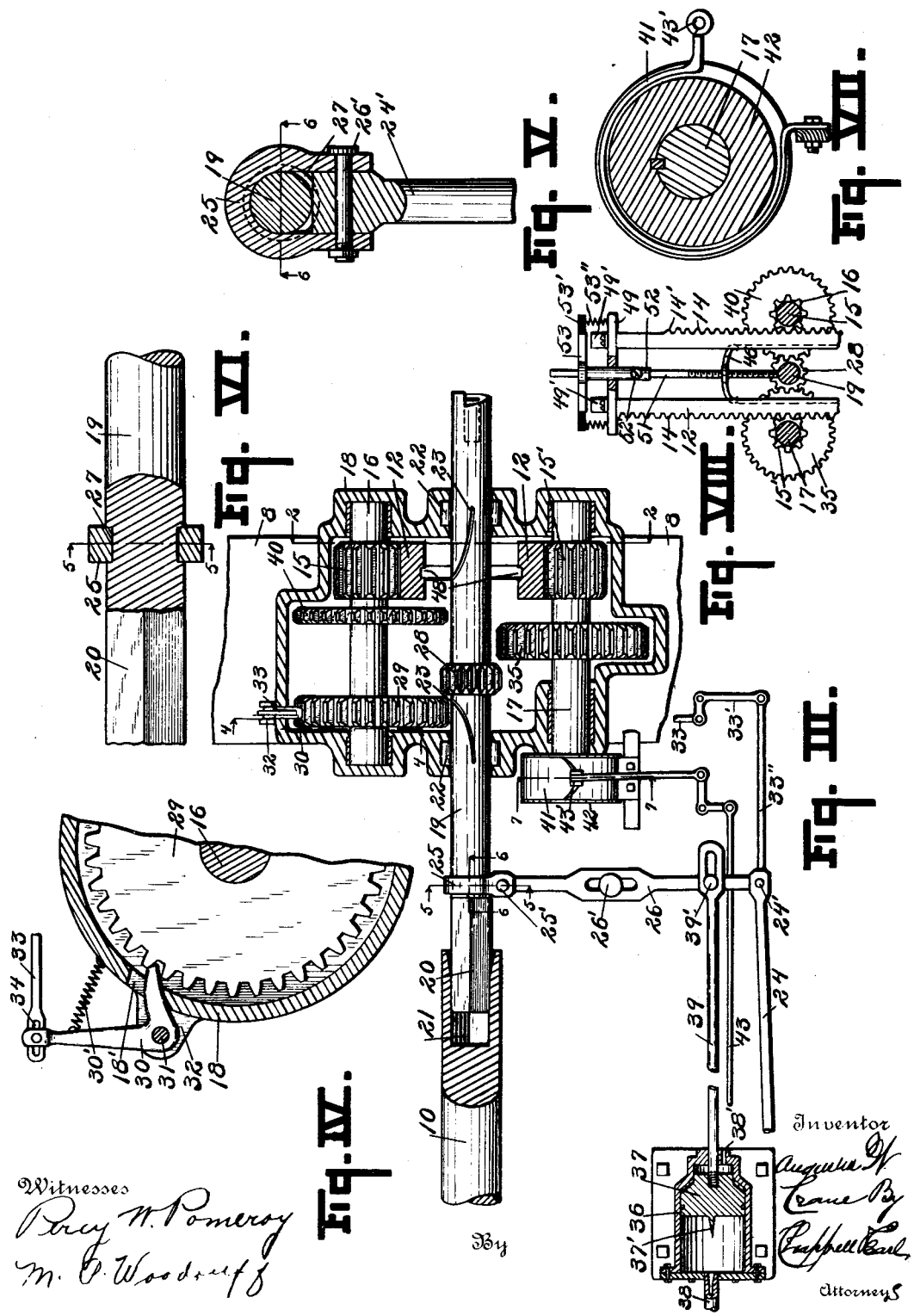

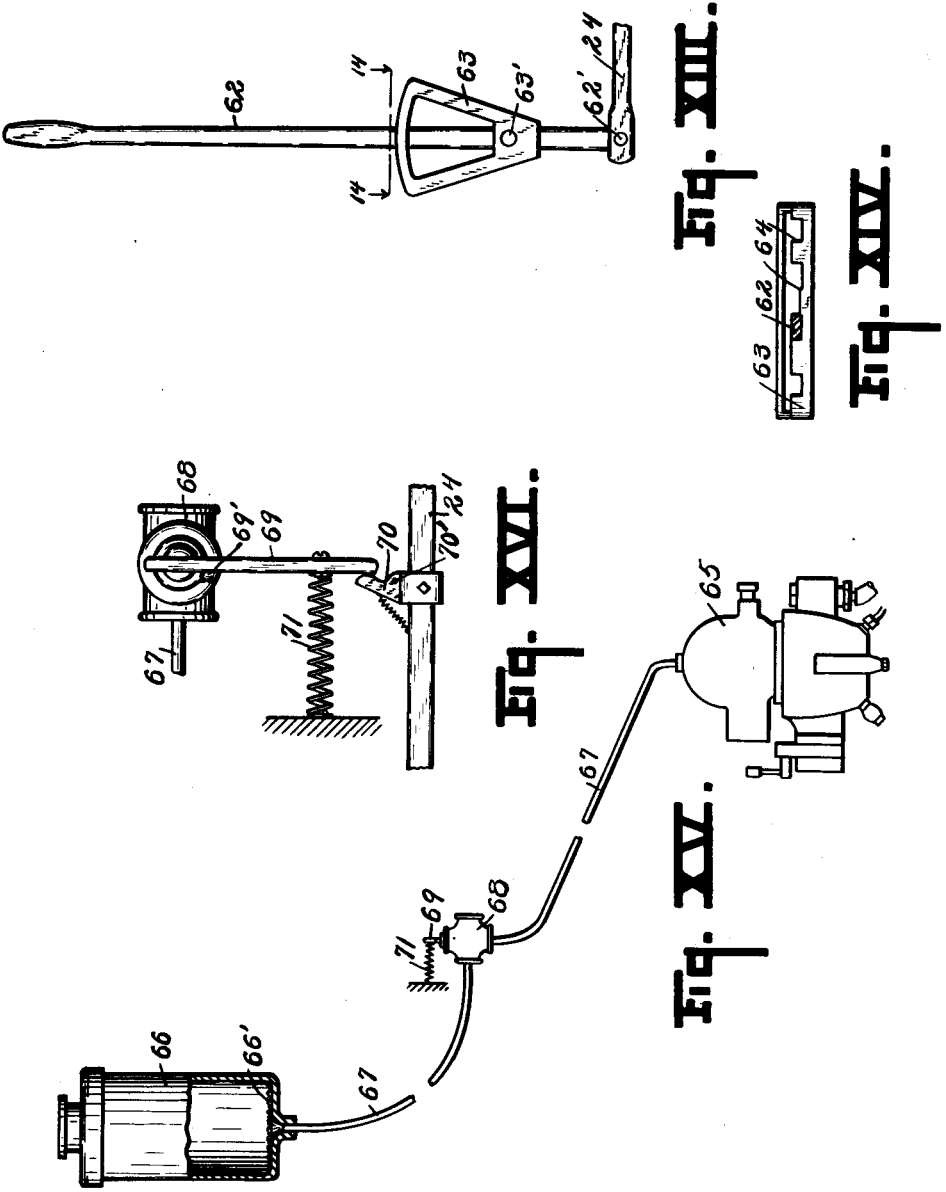

AUGUSTUS W. CRANE, OF KALAMAZOO, MICHIGAN.

AUTOMOBILE.

1,075,628.  Specification of Letters Patent.  Patented Oct. 14, 1913.

Application filed June 3, 1912. Serial No. 701,124.

*To all whom it may concern:*

Be it known that I, AUGUSTUS W. CRANE, a citizen of the United States, residing at Kalamazoo, Michigan, have invented certain new and useful Improvements in Automobiles, of which the following is a specification.

This invention relates to improvements in automobiles, the primary object of the invention being to provide improved self starting means for internal combustion engines in automobiles, although the improvements in certain particulars are adapted to other uses.

The objects of the invention are: First, to provide an improved means to start the internal combustion engine of an automobile by utilization of power stored by the elevation of a part thereof. Second, to provide means for elevating a part of an automobile by action of the engine thereof. Third, to provide means for utilizing the weight of an automobile or other car to impart the initial impulse to an internal combustion engine in starting the same. Fourth, to provide improved means for throwing the starting means out of gear, which may include automatic devices. Fifth, to provide an improved locking means for the parts of the starting device when the same are not in operation. Sixth, to provide a starting device which is adapted for adjustment and change to start the car under various conditions, such as different and varying temperatures due to climatic or other conditions.

Objects relating to details and economies of construction and operation of the mechanism will clearly appear from the detailed description to follow.

A structure constituting a preferred embodiment of my invention is clearly described in the following specification.

The invention is clearly defined and pointed out in the claims.

A structure which is one preferred embodiment of my invention, is fully illustrated in the accompanying drawing, forming a part of this specification, in which,—

Figure I is a side elevation of an automobile, certain portions being broken away, and with elevated positions of certain parts indicated by dotted lines, embodying the features of my invention. Fig. II is an enlarged detail sectional view partially in section, on a line corresponding to line 2—2 of Figs. I and III, certain portions being indicated by dotted lines only. Fig. III is an enlarged detail plan view partially in section, on the irregular section line 3—3 of Figs. I and II. Fig. IV is an enlarged detail sectional view taken on a line corresponding to line 4—4 of Fig. III, showing details of the ratchet connection for retaining elevated parts in position. Fig. V is a detail sectional view on line 5—5 of Figs. III and VI, showing the collar connection for shifting the starter crank shaft longitudinally. Fig. VI is a detail longitudinal sectional view on line 6—6 of Figs. III and V. Fig. VII is an enlarged detail transverse sectional view on line 7—7 of Fig. III through the brake drum for controlling the starter mechanism. Fig. VIII is an enlarged detail view of the upper portion of the elevating rack means and associated parts, showing the driving gears for the starting mechanism in the upper position in which they break the circuit to the ignition system of the engine and thereby stop the engine at the desired point. Fig. IX is a detail vertical sectional elevation view taken on a line corresponding to line 9—9 of Fig. II, showing details of construction of the inner side of one of the racks. Fig. X is an enlarged detail plan view of the upper plate for the elevating rack means. Fig. XI is an enlarged detail view of the spring connected yielding actuating means for coöperating with the elevating mechanism to control the circuit of the ignition system of the engine. Fig. XII is a diagrammatic view of the electric wiring system in coöperation with this device, showing the disposition of the starter switch. Fig. XIII is an enlarged detail side elevation view of a hand lever for manipulating various parts. Fig. XIV is an enlarged detail sectional view on line 14—14 of Fig. XIII, showing the various retaining notches for the hand lever in the retaining segment. Fig. XV is a detail view of an auxiliary feed for delivering ether or other highly volatile fuel to the carbureter, which is desirable in starting a car in cold weather. Fig. XVI is an enlarged detail of the automatic lever control for the auxiliary feed.

In the drawings, all of the sectional views are taken looking in the direction of the little arrows at the ends of the section lines, and similar numerals of reference refer to similar parts throughout the several views.

Considering the numbered parts of the drawing, the automobile body 1 is of the usual form, carried on the rear wheels 2 by the rear axle 3. The front wheels 4 are carried in the usual manner by the front axle 5. Long full elliptic side springs 6 are provided at the front and a transverse elliptic spring 7 is placed directly on the axle. A cross bar 8 of the frame is the support for my improved mechanism, the case of which is firmly secured thereto to elevate the body. The engine 9 is conventionally illustrated and is provided with the usual engine crank shaft 10 which projects forwardly therefrom, and is shown enlarged in Fig. III.

A double rack construction 12 is supported on a suitable base 12′ and is secured to the upper side of the elliptic spring 7 by suitable clips 13—13, and is provided with a rubber bumper or buffer 11 disposed between the racks at the bottom. The rack teeth 14 are at the outside of each rack with an open space above the right hand portion, the last tooth 14′ at the top being a half tooth, and with a vacant space at the bottom of the left hand rack with a half tooth 14′ at the bottom, to facilitate engagement, the structures being operative for purposes to be hereinafter indicated, as seen in Fig. II. Still considering Fig. II, a pinion 15 on the shaft 16 is at the right hand and engages the right hand rack, the function of which is to elevate the front portion of the automobile by engagement with the teeth 14 of the said right hand rack. A pinion 15′ on shaft 17 engages the left hand rack 12 and suitable means are provided whereby the weight of the automobile in descending will coact and cause this shaft 17 to rotate, and by the rotation of the same, and by the means hereinafter to be described, will give the engine its initial motion. The shaft 17 is free to rotate when it descends below the rack and carries pinion 15′ out of mesh. These gears and shafts themselves are supported in a suitable case or housing 18, which is here shown as made of cast metal, although it may be made of suitable stamping or forging.

The actuating shaft 19 has a square end 20 and engages a corresponding socket 21 in the engine shaft 10. This socket has a flaring mouth to receive the said square end 20 of the shaft 19. The shaft 19 is movable longitudinally to connect and disconnect the same to the engine shaft 10. The shaft 19 is supported by suitable roller bearings 22—22 at each side of the casing, although any suitable bearing may be provided for this purpose. In the shaft 19 I provide suitable oil grooves 23—23 longitudinally thereof for receiving any lubricant that may be in the case and delivering it to the bearings so that these parts will run very smoothly, as the said shaft 19 in use may be left connected for a considerable time. This shaft 19 is shifted longitudinally by the connecting rod 24 manipulated by various means hereinafter to be described or by connections to any lever or part already on the automobile that may be available. This connecting rod 24 connects to the shifting collar 25 by a suitable lever 26, the rod 24 being suitably connected to one end thereof by pivot pin 24′. The lever 26 is slotted to play on the fulcrum 26′ and is connected by pivot 25′ to the collar 25. The collar 25 embraces the annular seat 27 in the shaft 19 which freely revolves therein, as clearly illustrated in detail in Figs. V and VI. Suitable lubricating means should be provided.

A pinion 28 is on the shaft 19 which, for elevating the front part of the automobile, meshes with the gear 29 on the shaft 16. So that the parts may not drop down, a ratchet means is provided to engage the gear teeth of this gear 29 consisting of the lever pawl 30, pivoted at 31 on ears 32 extending from the side of the gear case 18. The gear case is apertured at 18′ to permit the movement of the said pawl 30, which is held yieldingly into engagement by the spring 30′, all of which parts clearly appear in Fig. IV. A link 33 is connected by a bell crank 33′ to a rod 33″, which is connected to the pivot 24′ of the actuating rod 24, so that this pawl is thrown out of engagement by the manipulation or pull of the rod 24. The connecting link 33 is slotted at 34′ so that the pawl is not lifted out until after the shaft 19 has been shifted longitudinally for the gear 28 to mesh with the gear 35 on the shaft 17. The ratchet should release slightly in advance of the engagement of the gears so that the beveled ends of the teeth can slide into place, which can be done best when the parts are rotating. The pawl is thus pulled out and the load of the car is allowed to carry the casing 18 downward, and the pinion 28 is driven by the gear 35, and the gear 35 is driven owing to the meshing of the pinion 15 with the left hand rack 12, so that this permits manipulation of the connecting rod 24 which throws the shaft into engagement to be actuated by the descent of the vehicle. The gear 35 is permitted to run free by the pinion 15′ passing out of engagement with the gear teeth 14 on the left hand rack 12.

A comparatively thin gear wheel 40 is provided on the shaft 16, which meshes with the pinion 28 while the pinion is moved forward and is still in mesh with the gear 35. It will be seen that when this adjustment occurs that the pinion 28 interlocks with the gear 35 and positively locks the starting means at whatever point the same is disengaged, so that the parts are effectively locked while the vehicle is being transported from place to place. The shaft 19 is thus completely withdrawn from the engine shaft 10 before the gear 40 is engaged by the pinion 28. This prevents jolting of the car causing movement of the parts when the starter is out of gear.

As a safety device, I provide automatic means for throwing this starter out of gear as soon as explosions occur in the engine. This is done by means of the auxiliary cylinder 36 containing piston 37, the cylinder being connected by the pipe 39 to one of the cylinders of the engine, so that as soon as an explosion occurs within that cylinder, pressure will be generated against the piston 37 in the cylinder 36 and drive the same to one side. An exhaust aperture 38' is provided in the cylinder to permit the actuation of the piston 37. A piston rod 39 slotted at its forward end, engages a pin 39' on the lever 26. When the explosion occurs, this promptly actuates the lever 26 and shifts the shaft 19 to the position indicated in Fig. III, which is the neutral position, throwing the driving means entirely out of gear and permitting the engine and shaft 19 to run free. The piston 37 acts as a closed valve while gear 28 is in mesh with gear 29. The piston 37 is automatically closed ready for an explosion in the cylinder when pinion 28 is thrown in mesh with gear 35. When the pinion 28 is shifted to mesh with gear 40, the needle 37' on piston 37 closes the pipe 38. This needle 37' is withdrawn and the pipe 38 opened when the lever is again manipulated to start the engine.

A band brake 41 is provided on a brake drum 42 which is secured to the outer end of the shaft 17. A connection 43 extends therefrom to the foot lever 44 in the automobile, whereby the operator can control and regulate the descent of the front of the vehicle when manipulating the same in starting the engine. While this is desirable, it is not essential, but merely a regulating means.

I provide special automatic means for opening and closing the electric circuit to the spark plugs, consisting of spring cross pieces 45, 46, connected by tension springs 47—47, and disposed in vertical grooves 48—48 on the insides of the racks 12 to be acted upon by the rise and fall of the shaft 19 when carried up and down by the gear case 18. The spring cross piece 46 exerts sufficient friction to cause the knife switch, see Fig. X, to stand open until the descent of the shaft 19 carries down the spring cross piece 45 and closes the knife switch.

The upper cross bar 46 is provided with a screw threaded aperture 46' at the center, in which is disposed the vertically adjustable screw 51, which is retained in the sleeve 52 by the set screw 52'. A top plate 49, with downwardly-projecting members, is retained in place by a pair of strong tension springs 50—50 at each side. The sleeve 52 is provided with a fin 52'' in a suitable keyway in the aperture of the top plate 49, and on its upper end carries a transverse knife switch bar 53, coöperating with corresponding switch members 49' on the plate 49. For certain purposes, insulated extensions 53' are connected by detachable springs 53'' to the top plate 49, automatically closing the switch 53 when the shaft 19 descends. This is for use in very cold weather, and insures the immediate operation of the sparking device and continued operation until an explosion occurs that throws the starting means out of gear. It is not made use of in warm weather.

In warm weather, a less number of rotations of the engine shaft is necessary, and I provide for that by dropping the shaft 19, when a considerable momentum has been attained, against the lower stop 45, and by continued pressure of the same eventually close the switch 53 at the front and pass the current through the engine, thereby igniting the charges which have been passed to the engine by the initial actuation. In warm weather, too, it is not necessary to elevate the car to the top of the rack, so I have provided an adjustable stop rod 51, and the engine can run up against the same and lift the switch, which is retained in place by elastic springs, and thereby stop the engine at any predetermined point less its full elevation. From this description, the operation of these various parts is very clear.

The description of the ignition circuit is clearly illustrated in the diagrammatic view of Fig. XII. An extension or loop 54 is provided and controlled by the switch 51, the said switch cutting out the ignition system whenever the front of the machine is elevated and the switch 51 is actuated. This circuit extends through the switch 55 for shifting from the battery 61 to the magneto 56, extends at 57 to the ground, and passes through the timer 59 and the circuits 60 to the spark plugs 58, which are also grounded at 57 as indicated by dotted lines. My invention does not pertain to these details and the same are shown merely in conventional form.

A hand lever 62 for manipulating the various parts is fulcrumed at 63' in a suitable segment 63 on the side of or within the car, and is controlled by notches 63, 64 in the side of said segment.

To insure perfect operation in cold weather, I provide a supplemental fuel supply of ether or some other highly volatile fuel. I supply an auxiliary tank 66 for this, provided with a screen 66' on the bottom, with a conductor tube 67 to the carbureter 65. I provide a cock 68 at any convenient point for controlling this tube 67, the plug therefor being provided with a lever handle 69 held yieldingly against the stop 69' by spring 71 or other suitable means.

On the connecting rod 24, for controlling the other parts of my improved apparatus, I provide a spring trip finger 70, pivoted at 70', for actuating and opening the cock by acting against the lever 69 thereof, so that when the starter is thrown into gear for starting the engine in its initial movement, this cock will be automatically opened and a quantity of the ether or other highly volatile fuel will be delivered into the carbureter and distributed to the engine. The spring trip 70 passes the lever 69 and permits the cock, by action of the spring 71, to close when the gears are locked. When the lever is returned, the trip 70, being pivoted at 70', passes the lever 69 to the initial position thereof ready to repeat the evolution.

I have illustrated and described my invention in the form preferred by me, but desire to state that this form can be greatly varied without departing from the invention. If, for any reason, the engine should be located toward the rear of the car, the mechanism very clearly could be adapted for use in that relation. Also, it is very clear that the elevation of the car in this way would be quite desirable for the inspection of the engine and for repair work, and the invention might be of use even though it did not involve the principle of a self starter.

When I use the term "body", I mean a substantial part or associated part of sufficient weight to do the work specified. I desire to claim not only the full combination, but such sub-combinations as involve the proper manipulation of the body by the action of the engine itself.

I have shown my invention in its complete form. The automatic appliances and certain devices very clearly might be omitted and the device still be quite effective for its purpose.

I desire to claim the invention broadly and specifically, and I desire to claim the special features specifically as pointed out in the appended claims.

It is hardly necessary to remark that this device does not in any way interfere with cranking the engine in the ordinary way, the only requirement being that the lever 62 be placed at neutral, as shown in Fig. XIV.

Having thus described my invention, what I claim as new and desire to secure by Letters Patent is:

1. In an automobile, the combination of an internal combustion engine, an automobile body and the usual carrying wheels front and rear on suitable axles; suitable springs comprising a transverse elliptic spring on the forward axle; an upright double rack structure with open space at the center secured to the said transverse spring; gear devices comprising suitable pinions disposed to mesh with said racks; a gear case embracing the same secured to a cross bar of the frame; a connection from the automobile engine for driving one of the pinions to elevate the body of the vehicle through coaction with the said rack; locking means to lock the parts against movement and retain the vehicle body in an elevated position; driving connections from a pinion to said engine; means for releasing the lock to permit the vehicle body to descend and impart power by the meshing of the driving pinion with the said rack for imparting to the engine its initial movement; means for throwing said engine actuating means out of gear after the engine starts; electric switch devices disposed in the ignition circuit of said engine with trip means disposed to be actuated by the movement of the parts to automatically break the ignition circuit when the predetermined elevation is reached; a locking means for the gear in its normal position; a brake means for controlling the descent of the body; automatic means comprising an auxiliary cylinder and piston connected with the combustion chamber of an engine cylinder for automatically throwing the piston to throw the starter mechanism out of gear; an actuated lever for controlling the parts; and an auxiliary feed with an automatic valve disposed to be opened when the starting lever is manipulated, coacting substantially as described for the purpose specified.

2. In an automobile, the combination of an internal combustion engine, an automobile body and the usual carrying wheels front and rear on suitable axles; suitable springs comprising a transverse elliptic spring on the forward axle; an upright double rack structure with open space at the center secured to the said transverse spring; gear devices comprising suitable pinions disposed to mesh with said racks; a gear case embracing the same secured to a cross bar of the frame; a connection from the automobile engine for driving one of the pinions to elevate the body of the vehicle through coaction with the said rack; locking means to lock the parts against movement and retain the vehicle body in an elevated position; driving connections from a pinion to said engine; means for releasing the lock to permit the vehicle body to descend and impart power by the meshing of the driving pinion with the said rack for imparting to the engine its initial movement; means for throwing said engine actuating means out of gear after the engine starts; electric switch devices disposed in the ignition circuit of said engine with trip means disposed to be actuated by the movement of the parts to automatically break the ignition circuit when the predetermined elevation is reached; a locking means for the gear in its normal position; a brake means for controlling the descent of the body; automatic means comprising an auxiliary cylinder and piston connected with the combustion chamber of an engine cylinder for automatically throwing the piston to throw the starter mechanism out of gear; and an actuated lever for controlling the parts, coacting substantially as described for the purpose specified.

3. In an automobile, the combination of an internal combustion engine, an automobile body and the usual carrying wheels front and rear on suitable axles; suitable springs comprising a transverse elliptic spring on the forward axle; an upright double rack structure with open space at the center secured to the said transverse spring; gear devices comprising suitable pinions disposed to mesh with said racks; a gear case embracing the same secured to a cross bar of the frame; a connection from the automobile engine for driving one of the pinions to elevate the body of the vehicle through coaction with said rack; locking means to lock the parts against movement and retain the vehicle body in an elevated position; driving connections from a pinion to said engine; means for releasing the lock to permit the vehicle body to descend and impart power by the meshing of the driving pinion with the said rack for imparting to the engine its initial movement; means for throwing said engine actuating means out of gear after the engine starts; electric switch devices disposed in the ignition circuit of said engine with trip means disposed to be actuated by the movement of the parts to automatically break the ignition circuit when the predetermined elevation is reached; automatic means comprising an auxiliary cylinder and piston connected with the combustion chamber of an engine cylinder for automatically throwing the piston to throw the starter mechanism out of gear; and an actuated lever for controlling the parts, coacting substantially as described for the purpose specified.

4. In an automobile, the combination of an internal combustion engine, an automobile body and the usual carrying wheels front and rear on suitable axles; suitable springs comprising a transverse elliptic spring on the forward axle; an upright double rack structure with open space at the center secured to the said transverse spring; gear devices comprising suitable pinions disposed to mesh with said racks; a gear case embracing the same secured to a cross bar of the frame; a connection from the automobile engine for driving one of the pinions to elevate the body of the vehicle through coaction with the said rack; locking means to lock the parts against movement and retain the vehicle body in an elevated position; driving connections from a pinion to said engine; means for releasing the lock to permit the vehicle body to descend and impart power by the meshing of the driving pinion with the said rack for imparting to the engine its initial movement; means for throwing said engine actuating means out of gear after the engine starts; electric switch devices disposed in the ignition circuit of said engine with trip means disposed to be actuated by the movement of the parts to automatically break the ignition circuit when the predetermined elevation is reached; a locking means for the gear in its normal position; a brake means for controlling the descent of the body, and an actuated lever for controlling the parts, coacting substantially as described for the purpose specified.

5. In an automobile, the combination of an internal combustion engine, an automobile body and the usual carrying wheels front and rear on suitable axles; suitable springs comprising a transverse elliptic spring on the forward axle; an upright double rack structure with open space at the center secured to the said transverse spring; gear devices comprising suitable pinions disposed to mesh with said racks; a gear case embracing the same secured to a cross bar of the frame; a connection from the automobile engine for driving one of the pinions to elevate the body of the vehicle through coaction with the said rack; locking means to lock the parts against movement and retain the vehicle body in an elevated position; driving connections from a pinion to said engine; means for releasing the lock to permit the vehicle body to descend and impart power by the meshing of the driving pinion with the said rack for imparting to the engine its initial movement; means for throwing said engine actuating means out of gear after the engine starts; electric switch devices disposed in the ignition circuit of said engine with trip means disposed to be actuated by the movement of the parts to automatically break the ignition circuit when the predetermined elevation is reached; and an actuated lever for controlling the parts, coacting substantially as described for the purpose specified.

6. In a gravity starting device for an automobile the combination of the internal combustion engine; an automobile body; actuating means carried by the said body and connected to be driven by said engine for elevating a body part of said car; driving means with suitable connections to be driven by the power of the descending body part for imparting initial movement to the engine; and devices for throwing the same in and out of gear, coacting for the purpose specified.

7. In a gravity starting device for an automobile, the combination of the internal combustion engine; an automobile body; actuating means carried by said body and connected to be driven by said engine for elevating a body part of said car; cut-out devices for the ignition circuit disposed to be actuated by the elevated parts; driving means with suitable connections to be driven by the power of the descending body part for imparting initial movement to the engine; and devices for throwing the same in and out of gear, coacting for the purpose specified.

8. In a gravity starting device for an automobile, the combination of the internal combustion engine; an automobile body; actuating means carried by said body and connected to be driven by said engine for elevating a body part of said car; and driving means with suitable connections to be driven by the power of the descending body part for imparting initial movement to the engine, coacting for the purpose specified.

9. In a gravity starting device for an automobile, the combination of the internal combustion engine; an automobile body; actuating means carried by the said body and connected by said engine for elevating a body part of said car; cut-out devices for the ignition circuit disposed to be actuated by the elevated parts; and driving means with suitable connections to be driven by the power of the descending body part for imparting initial movement to the engine, coacting for the purpose specified.

10. In an automobile, the combination of the automobile body and the usual carrying wheels front and rear on suitable axles; a spring on the forward axle; a rack structure secured to a spring on the forward axle; gear devices in a suitable gear case involving pinions to mesh with said rack secured to the frame of the body and co-operating with the said rack; a connection to the engine for driving a pinion for elevating the body on the rack; means to lock the same in elevated position; means for releasing the elevating pinion; connections by suitable gearing to the engine for imparting to the same its initial movement as the automobile body descends; means for throwing the same into gear; and means for throwing the same out of gear after the engine starts, all coacting substantially as described for the purpose specified.

11. In a self starting device for internal combustion engines for automobiles, the combination with the vehicle body of power storing devices comprising means for elevating a portion of the said body; means to drive the same by the engine; means of utilizing the stored power to start the engine; and a brake to control the same, as specified.

12. In a self starting device for internal combustion engines for automobiles, the combination with the vehicle body of power storing devices comprising means for elevating a portion of the said body; means to drive the same by the engine; and means of utilizing the stored power to start the engine, as specified.

In witness whereof, I have hereunto set my hand and seal in the presence of two witnesses.

AUGUSTUS W. CRANE. [L. S.]

Witnesses:
PERCY W. POMEROY,
M. PHINA WOODRUFF.